(12) United States Patent
Sirgedas

(10) Patent No.: US 6,805,281 B1
(45) Date of Patent: Oct. 19, 2004

(54) METHOD OF MELTING MATERIAL BETWEEN TELESCOPINGLY ENGAGED ELEMENTS

(76) Inventor: Joseph Sirgedas, 1608 S. 50th Ct., Cicero, IL (US) 60804

( * ) Notice: Subject to any disclaimer, the term of this patent is extended or adjusted under 35 U.S.C. 154(b) by 224 days.

(21) Appl. No.: 09/722,775

(22) Filed: Nov. 27, 2000

(51) Int. Cl.$^7$ .............................. B23K 1/00; B23K 35/12
(52) U.S. Cl. ......................... 228/246; 228/126; 228/245
(58) Field of Search ................................ 228/246, 245, 228/126, 56.3; 219/85.1, 85.2

(56) References Cited

U.S. PATENT DOCUMENTS

| | | | | |
|---|---|---|---|---|
| 3,584,372 A | * | 6/1971 | Larson ........................ | 219/118 |
| 3,639,721 A | * | 2/1972 | Hubbel ....................... | 219/91.2 |
| 3,745,644 A | * | 7/1973 | Moyer et al. ................. | 29/515 |
| 3,784,239 A | * | 1/1974 | Carter et al. ............. | 285/294.2 |
| RE28,457 E | * | 7/1975 | Dawson ...................... | 285/354 |
| 3,968,982 A | * | 7/1976 | Belicic ....................... | 228/56.3 |
| 3,995,964 A | * | 12/1976 | De Groef .................... | 403/272 |
| 3,998,478 A | * | 12/1976 | Zopfi .......................... | 277/607 |
| 4,066,861 A | * | 1/1978 | Broodman ................... | 165/173 |
| 4,092,193 A | * | 5/1978 | Brooks ........................ | 156/83 |
| 4,174,563 A | * | 11/1979 | Simpson ...................... | 29/628 |
| 4,527,819 A | * | 7/1985 | Desilets et al. ............. | 228/154 |
| 4,576,325 A | * | 3/1986 | Maurice ...................... | 228/135 |
| 4,705,307 A | * | 11/1987 | Chelette ................... | 285/332.3 |
| 4,940,179 A | * | 7/1990 | Soni .......................... | 228/56.3 |
| 4,958,857 A | * | 9/1990 | Sixsmith .................... | 285/21.2 |
| 5,368,223 A | * | 11/1994 | Chevrel et al. ............. | 228/214 |
| 5,378,855 A | * | 1/1995 | Delalle ....................... | 174/87 |
| 5,397,858 A | * | 3/1995 | Delalle ........................ | 174/87 |
| 5,450,666 A | * | 9/1995 | Conn et al. .................... | 148/23 |
| 5,796,045 A | * | 8/1998 | Lancien et al. ............. | 174/109 |
| 6,264,062 B1 | * | 7/2001 | Lack et al. ................. | 221/267 |
| 6,373,024 B1 | * | 4/2002 | Safarevich et al. ..... | 219/121.64 |
| 6,446,857 B1 | * | 9/2002 | Kent et al. .................. | 228/139 |
| 2002/0100540 A1 | * | 8/2002 | Savitski et al. ............. | 156/157 |

FOREIGN PATENT DOCUMENTS

| | | | |
|---|---|---|---|
| EP | 0493316 A1 | * | 7/1992 |
| GB | 2092692 A | * | 8/1982 |
| GB | 2126298 A | * | 3/1984 |
| JP | 58-212891 A | * | 12/1983 |
| JP | 10-238671 A | * | 9/1998 |

* cited by examiner

Primary Examiner—L. Edmondson
(74) Attorney, Agent, or Firm—Wood, Phillips, Katz, Clark & Mortimer

(57) ABSTRACT

A method of forming a meltable material at a joint between telescopingly engaged male and female elements, with the female element having a joint surface that surrounds a joint surface of the male element. The method includes the steps of: placing a ring of the meltable material around one of the male and female elements at a first location spaced from the joint; heating the male and female elements at the joint to a temperature at which the meltable material melts; sliding the ring of meltable material from the first location to a second location; with the ring of meltable material at the second location and the male and female elements of the joint at a temperature at which the meltable material melts, causing the meltable material to flow between the male and female joint surfaces; and cooling the male and female elements at the joint to solidify the meltable material between the male and female joint surfaces.

21 Claims, 1 Drawing Sheet

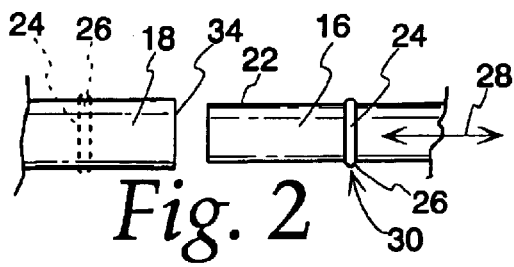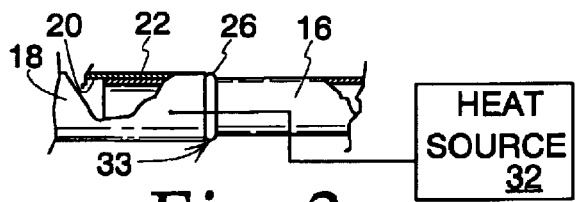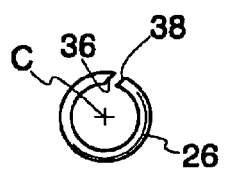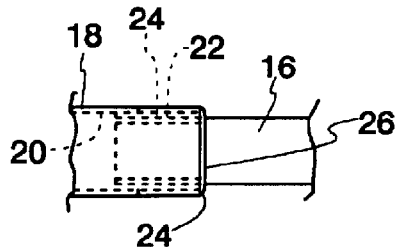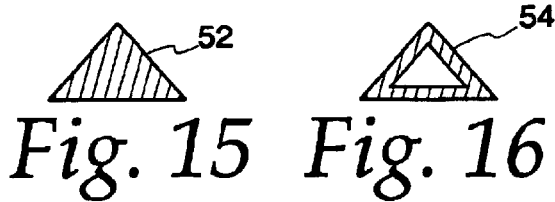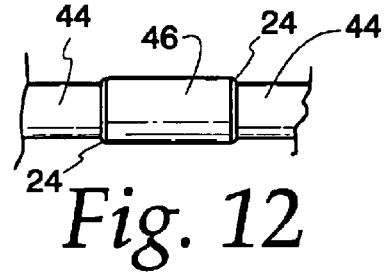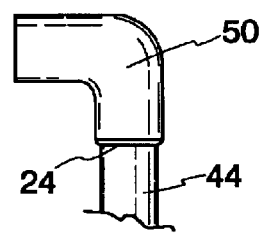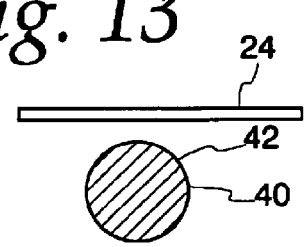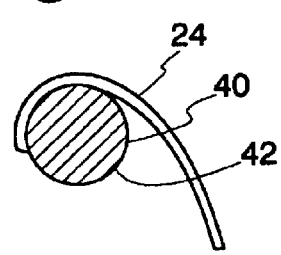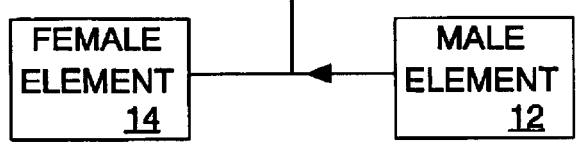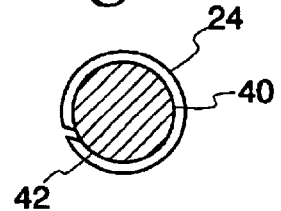

METHOD OF MELTING MATERIAL BETWEEN TELESCOPINGLY ENGAGED ELEMENTS

BACKGROUND OF THE INVENTION

1. Field of the Invention

This invention relates to telescopingly engaged elements, such as cylindrical pipes and, more particularly, to a method of melting a material to connect and/or seal between the elements.

2. Background Art

There are myriad different environments in which telescopingly engaged elements are required to be connected and/or sealed at a joint by utilizing metal and/or other material which is melted to flow between the joint and then solidified. One such environment is in the plumbing industry. Valves, pipe fittings, and lengths of pipe are designed with joint portions to slide telescopingly, one inside the other. Conventionally, the joint portions are prepared by using a cleaner, a brush, an abrasive sheet, or the like, to clean the facing surfaces at the joint and to potentially roughen the surfaces so that the solder, or the like, will more tenaciously adhere thereto. On completion of this process, the joint portions are directed, one inside the other, to a desired, final relative position. Flux material may be applied at the joint. The joint portions are then heated as with a torch to a temperature above the melting point of the solder, which may be a pure solder material or have an additive to enhance adherence to the joint portions. Once the desired temperature is realized, the solder is directed into the space between the overlapping joint portions by presentation of the solder to the edge of the female element. The solder is drawn into the joint as this occurs.

Typically, solder is provided for this purpose in a wire form, with the wire wrapped around a spool. The user typically unwraps a length of the solder which can be relatively easily shaped and which will maintain the shape selected. In an environment wherein the space around the joint is unobstructed, it is common to apply the solder in a continuous motion through 360° around the joint. This is commonly done by paying out several inches of the solder and placing it in a straight form, holding the spool, and through the wrist moving the solder in a wrapping motion around the joint region.

One problem encountered in this process is that it is often difficult to gauge whether the optimum amount of solder has been deposited around the entire joint. Failure to flow the solder completely around the joint may result in a leak, which may require that the joint be broken, re-cleaned, and re-processed as described above.

Commonly, to avoid the situation where the solder has not fully flowed around the joint, a person may apply an excess of solder. Excess solder flows around the joint and becomes wasted. Also, the excess solder that flows away from the joint may accumulate and become unsightly and may potentially damage adjacent walls, floors, or objects thereon.

One manner of removing excess solder is to wipe the excess solder, as with a cloth, with the solder in a molten state. This introduces an additional step and also places the individual performing the step at risk to becoming exposed to the hot solder.

Another problem that is encountered occurs when there is an obstruction in the vicinity of the joint which prohibits viewing of the entire joint and which obstructs the application of the solder around a part of the joint. It is common in some situations for a user to bend the solder into a U shape at its end and to blindly attempt to deposit the solder in a region that cannot be viewed. There is again, in this situation, a risk that the solder will not be flowed fully around the joint, which could lead to leakage or a weak joint. Also, the user blindly applying the solder will have a tendency to apply an excess which potentially results in waste, unsightly drips, and spattering of the molten solder in the vicinity of the joint, as on floors, walls, etc.

SUMMARY OF THE INVENTION

In one form, the invention is directed to a method of forming a meltable material at a joint between telescopingly engaged male and female elements, with the female element having a joint surface that surrounds a joint surface of the male element. The method includes the steps of: placing a ring of the meltable material around one of the male and female elements at a first location spaced from the joint; heating the male and female elements at the joint to a temperature at which the meltable material melts; sliding the ring of meltable material from the first location to a second location; with the ring of meltable material at the second location and the male and female elements of the joint at a temperature at which the meltable material melts, causing the meltable material to flow between the male and female joint surfaces; and cooling the male and female elements at the joint to solidify the meltable material between the male and female joint surfaces.

In one form, the male and female elements are heated at the joint to a temperature at which the meltable material melts before the ring of meltable material is moved from the first location to the second location.

The step of placing a ring of the meltable material around one of the male and female elements may involve bending a piece of the meltable material around the one of the male and female elements. Alternatively, the one of the male and female elements can be directed through a preformed ring of the meltable material.

In one form, the ring of meltable material extends continuously through 360°. The ring of meltable material preferably extends through at least 330°.

In one form, the ring of meltable material is a formed piece of wire with spaced ends.

In one environment, the meltable material is solder and the male and female elements each comprise one of a piece of pipe and a pipe fitting.

The invention is also directed to a method of forming a meltable material at a joint between telescopingly engaged male and female elements including the steps of: placing a ring of the meltable material around the male element at the joint but not within the female element; heating the male and female elements at the joint to a temperature at which the meltable material melts; causing the melted meltable material to flow between the male and female elements; and cooling the male and female elements at the joint to solidify the meltable material between the male and female joint surfaces.

The invention is further directed to a method of making a connection between male and female elements, with the female element having an internal joint surface and the male element having an external joint surface. The method includes the steps of: providing a ring of meltable material; directing one of the male and female elements through the ring of meltable material; after directing the one of the male and female elements through the ring of meltable material, directing the male element into the female element so that the female joint surface surrounds the male joint surface; heating the male and female joint surfaces to a temperature at which the meltable material melts; causing the melted meltable material to flow between the male and female joint surfaces; and cooling the male and female joint surfaces to solidify the meltable material between the male and female joint surfaces.

The method may further include the steps of placing the ring of meltable material at a first location spaced from the female element as the male and female joint surfaces are heated, and after heating the male and female joint surfaces to a temperature at which the meltable material melts, sliding the ring of meltable material from the first location to a second location at which melted meltable material can flow between the male and female joint surfaces.

BRIEF DESCRIPTION OF THE DRAWINGS

FIG. 1 is a schematic representation of an environment for practicing the inventive method and including any type of male and female elements between which a meltable material is directed to establish a seal and/or maintain a connection therebetween;

FIG. 2 is a fragmentary, side elevation view of male and female elements in spaced relationship and with a ring of meltable material placed therearound according to the present invention;

FIG. 3 is a view as in FIG. 2 with the male element directed into the female element so that a joint surface on the female element surrounds a joint surface on the male element;

FIG. 4 is a view as in FIG. 3 with the ring of meltable material melted between the male and female joint surfaces;

FIG. 5 is an end elevation view of a ring of meltable material as used in FIGS. 2 and 3 and having a continuous construction;

FIG. 6 is a view as in FIG. 5 of a modified form of ring of meltable material having spaced ends;

FIG. 7 is a cross-sectional view of one type of material used to form the rings in FIGS. 5 and 6 and having a circular shape;

FIG. 8 is a view as in FIG. 7 showing a material having a squared cross-sectional configuration;

FIG. 9 is a cross-sectional end view of a male element and a straight length of meltable material to be formed therearound;

FIG. 10 is a view as in FIG. 9 with the meltable material being formed against and around an outer surface of the male element;

FIG. 11 is a view as in FIG. 10 with the wire material fully formed into a ring around the outer surface of the male element;

FIG. 12 is a fragmentary, elevation view of a coupling between the ends of two pipes joined according to the present invention;

FIG. 13 is a view as in FIG. 12 showing a connection between a pipe and a valve;

FIG. 14 is a view as in FIGS. 12 and 13 showing a connection between the end of a pipe and an elbow;

FIG. 15 is a cross-sectional end view of a modified form of male element useable according to the present invention; and FIG. 16 is a view as in FIG. 15 with a further modified form of male/female element that can be used to practice the inventive method.

DETAILED DESCRIPTION OF THE DRAWINGS

As shown generically in FIG. 1, the present invention is directed to a method of forming a meltable material 10 between telescopingly engaged male and female elements 12, 14, respectively. The inventive concept can be used with virtually any type of connection in which the joint between the male and female elements 12, 14 is to be maintained and or sealed. The male and female elements 12, 14 may be solid in construction or have a hollow construction and may be made from metal, plastic, composite materials, or otherwise. The meltable material may be metal, plastic, or virtually any type of material that is capable of being heated to a state wherein it will melt to a flowable form.

The inventive method will initially be described with respect to a male element 16 and female element 18 which are relatively repositionable between a separated state as in FIG. 2 to a state as in FIGS. 3 and 4, wherein the male and female elements 16, 18 are telescopingly engaged so that an internal joint surface 20 on the female element 18 surrounds an external joint surface 22 on the male element 16. The cooperating surfaces 20, 22 produce a joint between the male and female elements 16, 18. The surfaces 20, 22 are relatively dimensioned so that they cooperate to guide relative sliding movement between the male and female elements 16, 18 into the telescopingly engaged position. The shape of the cross sections of the surfaces 20, 22 is not critical, so long as the surfaces 20, 22 are complementary and provide a space of a dimension which allows a meltable material to be deposited therewithin so as to adhere to the surfaces 20, 22 sufficiently to maintain the joint and/or effect a seal between the surfaces 20, 22.

In this embodiment, the meltable material 24 is in the shape of a ring 26. The ring 26 is shaped to nominally match the cross-sectional shape of the surfaces 20, 22. In one form, the ring 26 is dimensioned so as to be slidable guidingly along the surface 22, as indicated by the double-headed arrow 28.

In this form of the inventive method, the ring of meltable material 26 is placed around the male element 16 at a first location 30 which is spaced from the joint at which the surfaces 20, 22 overlap. The male element 16 is then directed into the female element 18 to achieve the desired relative position thereof. Through an appropriate heat source 32, the temperature of the elements 16, 18 at the joint is elevated to the melting temperature for the meltable material 24. Once this temperature is realized, the ring of meltable material 26 is slid from the first location 30 to a second location at 33 against, or in the vicinity of, the free edge 34 of the female element 18. The meltable material 24 is then drawn in and melts uniformly through 360° around and between the surfaces 20, 22 and is adhered thereto.

The ring 26 of meltable material can be formed, as in a mold, to extend continuously through 360°, as shown in FIG. 5. Alternatively, the ring 26 of meltable material can be made from a wirelike material with spaced ends 36, 38 which are formed to abut to, or be in close proximity with, each other. Preferably any gap between the ends 36, 38 does not exceed a 30° angle measured from the ring center C so that there is a uniform distribution of the meltable material between the joint surfaces 20, 22.

The ring 26 of meltable material can have virtually any cross-sectional configuration. In FIG. 7, the ring 26 of meltable material is shown to have a round cross-sectional configuration. In FIG. 8, the ring 26 of meltable material is shown to have a square configuration. Virtually any cross-sectional configuration would be appropriate.

In an alternative form of the invention, the ring 26 of meltable material is placed around the female element 18, as shown in phantom lines in FIG. 2. Upon being heated, the ring 26 of meltable material can be slid guidingly along the female element 18 to the second location 33, whereat it will be melted in the manner previously described.

The invention also contemplates that the ring 26 of meltable material can be placed in the second location 33 prior to heating.

Another variation of the invention is described with respect to FIGS. 9–11. In these Figures, an element 40, which may be a male or female element but is shown as a male element, is telescopingly engageable with a complementary female or male element. The meltable material 24 is shown in a wire form which is shown initially in a straight state in FIG. 9. The wire is then placed against the outer surface 42 of the element 40 and progressively bent into a ring shape which is usable in the manner described with respect to FIGS. 2–4.

In FIGS. 12–14, one exemplary environment for the present invention is shown. This environment should not be viewed as limiting. In FIGS. 12–14, hollow pipes 44 are shown telescopingly engaged with various pipe fittings, which may be usable in any fluid environment, i.e., water, gas, etc. In FIG. 12, the pipes 44 are telescopingly engaged with a coupling 46. In FIG. 13, the pipe fitting is in the form of a valve 48. In FIG. 14, the pipe fitting is in the form of an elbow 50.

As noted above, the nature of the male and female elements 12, 14 is not limited by reason of shape or by being hollow or solid. As one example in FIG. 15, one of the male elements 52 is shown to have a solid triangular cross-sectional shape. Another male/female element usable according to the present invention is shown at 54 in FIG. 16 to have a hollow triangular shape.

With the present invention it is possible, by selecting the thickness of the ring of material 26, to predetermine the amount of meltable material that will flow into a joint region of telescopingly engaged elements. This takes guesswork out of whether or not the entire joint region has been appropriately permeated by the meltable material. At the same time, applying the meltable material does not require direct viewing of the entire circumference of the joint region. By using the ring construction, one can be assured that the entire 360° around a joint has been fully covered by the meltable material.

The invention can be practiced to form a meltable material to weld, solder, braze, etc. or simply to seal, where joint maintenance is not required.

The foregoing disclosure of specific embodiments is intended to be illustrative of the broad concepts comprehended by the invention.

I claim:

1. A method of forming a meltable material at a joint between telescopingly engaged male and female elements, said method comprising the steps of:

directing the male element into the female element so that the male and female elements are telescopingly engaged and a radially facing joint surface on the female element surrounds a radially facing joint surface on the male element;

with the male and female elements telescopingly engaged, placing a ring of the meltable material around one of the male and female elements at a first location;

sliding the ring of meltable material guidingly directly against the one of the male and female elements from the first location to a second location at which no appreciable portion of the meltable material resides between radially facing portions of the male element and the female element;

heating the male and female elements at the joint to a temperature at which the meltable material melts;

with the ring of meltable material at the second location and the male and female elements at the joint at a temperature at which the meltable material melts, causing the meltable material to flow between the male and female joint surfaces; and cooling the male and female elements at the joint to solidify the meltable material between the male and female joint surfaces.

2. The method of forming a meltable material at a joint between telescopingly engaged male and female elements according to claim 1 wherein the male and female elements are heated at the joint to a temperature at which the meltable material melts before the ring of meltable material is moved from the first location to the second location.

3. A method of forming a meltable material at a joint between telescopingly engaged male and female elements according to claim 1 wherein the meltable material is placed around the male element at the first location.

4. The method of forming a meltable material at a joint between telescopingly engaged male and female elements according to claim 1 wherein the step of placing a ring of the meltable material around one of the male and female elements comprises bending a piece of the meltable material around the one of the male and female elements.

5. The method of forming a meltable material at a joint between telescopingly engaged male and female elements according to claim 1 wherein the step of placing a ring of the meltable material around one of the male and female elements comprises directing the one of the male and female elements through a preformed ring of the meltable material.

6. The method of forming a meltable material at a joint between telescopingly engaged male and female elements according to claim 1 wherein the ring of meltable material extends continuously through 360°.

7. The method of forming a meltable material at a joint between telescopingly engaged male and female elements according to claim 1 wherein the ring of meltable material comprises a formed piece of wire with spaced ends.

8. The method of forming a meltable material at a joint between telescopingly engaged male and female elements according to claim 1 wherein the ring of meltable material extends through at least 330°.

9. The method of forming a meltable material at a joint between telescopingly engaged male and female elements according to claim 1 wherein the meltable material comprises solder.

10. The method of forming a meltable material at a joint between telescopingly engaged male and female elements according to claim 9 wherein the male and female elements each comprise one of a piece of pipe and a pipe fitting.

11. A method of forming a meltable material at a joint between telescopingly engaged male and female elements, the female element having a free edge, said method comprising the steps of:

directing the male element into the female element so that the male and female elements are telescopingly engaged and a radially facing joint surface on the female element surrounds a radially facing joint surface on the male element;

with the male and female elements telescopingly engaged, placing a ring of the meltable material around the male element at a first location spaced from the free edge of the female element, sliding the meltable material guidingly directly against the male element from the first location closer to the free edge of the female element to a second location at which no appreciable portion of the meltable material resides between radially facing portions of the male element and the female element;

heating the male and female elements at the joint to a temperature at which the meltable material melts;

with the meltable material at the second location, causing the melted meltable material to flow between the male and female elements; and cooling the male and female elements at the joint to solidify the meltable material between the male and female joint surfaces.

12. The method of forming a meltable material at a joint between telescopingly engaged male and female elements according to claim 11 wherein the step of placing a ring of the meltable material around one of the male and female elements comprises bending a piece of the meltable material around the one of the male and female elements.

13. The method of forming a meltable material at a joint between telescopingly engaged male and female elements according to claim 11 wherein the step of placing a ring of the meltable material around one of the male and female elements comprises directing the one of the male and female elements through a preformed ring of the meltable material.

14. The method of forming a meltable material at a joint between telescopingly engaged male and female elements according to claim 11 wherein the ring of meltable material extends continuously through 360°.

15. The method of forming a meltable material at a joint between telescopingly engaged male and female elements according to claim 11 wherein the ring of meltable material comprises a formed piece of wire with spaced ends.

16. A method of making a connection between male and female elements, said method comprising the steps of:

directing the male element into the female element so that the male and female elements are telescopingly engaged and a radially facing joint surface on the female element surrounds a radially facing joint surface on the male element;

providing a ring of meltable material;

with the male and female elements telescopingly engaged, directing one of the male and female elements through the ring of meltable material to a first location on the one of the male and female elements;

after directing the one of the male and female elements through the ring of meltable material, directing the male element into the female element so that the female joint surface surrounds the male joint surface;

with the male element in the female element, sliding the ring of the meltable material guidingly directly against the one of the male and female elements to a second location at which no appreciable portion of the meltable material resides between radially facing portions of the male element and the female element heating the male and female elements at the joint to a temperature at which the meltable material and thereby causing the melted meltable material at the second location to flow between the male and female elements; and cooling the male and female joint surfaces to solidify the meltable material between the male and female joint surfaces.

17. The method of making a connection between male and female elements according to claim 16 further comprising the steps of placing the ring of meltable material at a first location spaced from the female element as the male and female joint surfaces are heated and after heating the male and female joint surfaces to a temperature at which the meltable material melts sliding the ring of meltable material from the first location to a second location at which melted meltable material can flow between the male and female joint surfaces.

18. The method of making a connection between male and female elements according to claim 16 wherein the ring of meltable material extends continuously through 360°.

19. The method of making a connection between male and female elements according to claim 16 wherein the ring of meltable material comprises a formed piece of wire with spaced ends.

20. The method of making a connection between male and female elements according to claim 16 wherein the male and female elements each comprise one of a piece of pipe and a pipe fitting.

21. The method of making a connection between male and female elements according to claim 11 wherein in the second position, the ring of meltable material directly abuts to the free edge of the female element.

* * * * *